United States Patent
Usuki et al.

(10) Patent No.: US 10,503,385 B2
(45) Date of Patent: Dec. 10, 2019

(54) SWITCH, DEVICE CONTROL METHOD, AND PROGRAM

(71) Applicant: Panasonic Intellectual Property Management Co., Ltd., Osaka (JP)

(72) Inventors: Izumi Usuki, Osaka (JP); Kiyotaka Takehara, Nara (JP); Tsuyoshi Wanaka, Osaka (JP); Toshiaki Nakao, Osaka (JP); Kazuhiro Kawamoto, Osaka (JP); Makoto Kawasaki, Osaka (JP); Yasuhiro Yanagi, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/736,630

(22) PCT Filed: Jun. 13, 2016

(86) PCT No.: PCT/JP2016/002841
§ 371 (c)(1),
(2) Date: Dec. 14, 2017

(87) PCT Pub. No.: WO2016/203755
PCT Pub. Date: Dec. 22, 2016

(65) Prior Publication Data
US 2018/0173409 A1    Jun. 21, 2018

(30) Foreign Application Priority Data

Jun. 15, 2015 (JP) ................. 2015-120584

(51) Int. Cl.
*G06F 3/0484* (2013.01)
*G05B 15/02* (2006.01)
*G06F 3/0488* (2013.01)

(52) U.S. Cl.
CPC ......... *G06F 3/04847* (2013.01); *G05B 15/02* (2013.01); *G06F 3/04842* (2013.01); *G06F 3/04883* (2013.01); *G06F 2203/04803* (2013.01)

(58) Field of Classification Search
CPC .................................................. G06F 3/04847
(Continued)

(56) References Cited

U.S. PATENT DOCUMENTS 7,240,289 B2 * 7/2007 Naughton ............. H04L 12/282
                                                      348/E5.102
9,082,018 B1 * 7/2015 Laska ................. G06K 9/00711
(Continued)

FOREIGN PATENT DOCUMENTS

JP    2002-260871 A    9/2002
JP    2003-037877 A    2/2003
(Continued)

OTHER PUBLICATIONS

International Search Report issued in Application No. PCT/JP2016/002841 dated Aug. 23, 2016, with English translation.
(Continued)

*Primary Examiner* — William D Titcomb
(74) *Attorney, Agent, or Firm* — McDermott Will & Emery LLP (57) ABSTRACT

A switch includes a manipulation display, a processor, and an outputter. The manipulation display includes a manipulation section and a display section. The processor is configured to select one of a first state for giving an instruction as to operation of a specific device and a second state for giving an instruction as to operation of a prescribed device which is determined so as to correspond to a specific scene. The outputter is configured to output an instruction signal according to the first state or the second state selected by the (Continued)

processor when the manipulation display is manipulated. The processor is configured to select one of the first state and the second state in response to a specific manipulation performed on the manipulation display.

10 Claims, 6 Drawing Sheets

(58) Field of Classification Search
 USPC .......................................................... 715/736
 See application file for complete search history.

(56) References Cited

U.S. PATENT DOCUMENTS

| | | | |
|---|---|---|---|
| 9,330,478 B2* | 5/2016 | Anderson | G06T 19/006 |
| 2003/0020630 A1 | 1/2003 | Kawamata et al. | |
| 2004/0163073 A1 | 8/2004 | Krzyzanowski et al. | |
| 2010/0052843 A1* | 3/2010 | Cannistraro | G08C 17/00 |
| | | | 340/3.32 |
| 2012/0260184 A1* | 10/2012 | Dawes | G06F 3/0488 |
| | | | 715/736 |
| 2013/0007623 A1* | 1/2013 | Watanabe | H04L 41/22 |
| | | | 715/736 |
| 2013/0275877 A1* | 10/2013 | Varner | G06F 3/04847 |
| | | | 715/736 |
| 2013/0307875 A1* | 11/2013 | Anderson | G06T 19/006 |
| | | | 345/633 |
| 2015/0007038 A1* | 1/2015 | Sasaki | G06F 3/04817 |
| | | | 715/736 |
| 2015/0113418 A1* | 4/2015 | Sasaki | G06F 3/04817 |
| | | | 715/736 |
| 2015/0261427 A1* | 9/2015 | Sasaki | G06F 3/04817 |
| | | | 715/736 |
| 2015/0286388 A1* | 10/2015 | Jeon | G06F 3/04847 |
| | | | 715/736 |
| 2015/0379436 A1* | 12/2015 | Hakoda | G06Q 30/02 |
| | | | 705/5 |
| 2016/0078193 A1* | 3/2016 | Pinter | G06F 19/3418 |
| | | | 715/736 |
| 2016/0087853 A1* | 3/2016 | McCoy | H04L 67/025 |
| | | | 715/736 |
| 2016/0378302 A1* | 12/2016 | Gilger | G06F 3/04817 |
| | | | 715/736 |

FOREIGN PATENT DOCUMENTS

| | | |
|---|---|---|
| JP | 2003-102077 A | 4/2003 |
| JP | 2005-311735 A | 11/2005 |
| JP | 2006-350819 A | 12/2006 |
| JP | 2007-247254 A | 9/2007 |
| JP | 2008-191757 A | 8/2008 |
| JP | 2011-205413 A | 10/2011 |

OTHER PUBLICATIONS

Extended European Search Report issued in Application No. 16811230.8 dated May 11, 2018.

* cited by examiner

SWITCH, DEVICE CONTROL METHOD, AND PROGRAM

RELATED APPLICATIONS

This application is the U.S. National Phase under 35 U.S.C. § 371 of national Application No. PCT/JP2016/002841, filed on Jun. 13, 2016, which in turn claims the benefit of Japanese Application No. 2015-120584, filed on Jun. 15, 2015, the disclosures of which are incorporated by reference herein in their entirety.

TECHNICAL FIELD

The present invention relates to a switch for giving an instruction as to the operation of a device in a building, a device control method, and a program.

BACKGROUND ART

A technique for controlling a plurality of loads by one time of manipulation is known (for example, see Patent Literature 1). Patent Literature 1 describes a monitor terminal including a liquid crystal display and a touch panel. Patent Literature 1 further describes that the state of the monitor terminal transitions to a state where the monitor terminal functions as an on/off switch, a state where the monitor terminal functions as a group switch, or the like.

According to the technique described in Patent Literature 1, when specific loads are turned on/off, individual turning on/off of the loads or collective turning on/off of the loads is only selected.

CITATION LIST

Patent Literature

Patent Literature JP 2002-260871 A

SUMMARY OF INVENTION

It is an object of the present invention to provide a switch, a device control method, and a program which have a function of giving an instruction as to the operation of a specific device and a function of giving an instruction as to the operation of a device corresponding to a specific scene.

A switch according to one aspect of the present invention includes a manipulation display, a processor, and an outputter. The manipulation display includes a manipulation section and a display section. The processor is configured to select one of a first state for giving an instruction as to operation of a specific device and a second state for giving an instruction as to operation of a prescribed device which is set to correspond to a specific scene. The outputter is configured when the manipulation display is manipulated, to output an instruction signal according to the first state or the second state selected by the processor. The processor is configured to select one of the first state and the second state in response to a specific manipulation performed on the manipulation display.

A device control method according to one aspect of the present invention is used in a switch including a manipulation display including a manipulation section and a display section, and the method includes a process step and an output step. In the process step, one of a first state for giving an instruction as to operation of a specific device and a second state for giving an instruction as to operation of a prescribed device is determined so as to correspond to a specific scene. In the output step, an instruction signal according to the first state or the second state selected in the process step is output when the manipulation display is manipulated. In the process step, one of the first state and the second state is selected in response to a specific manipulation performed on the manipulation display.

A program according to one aspect of the present invention is a program configured to cause a computer to function as a processor in a switch. The switch includes a manipulation display including a manipulation section and a display section, the processor configured to select one of a first state for giving an instruction as to operation of a specific device and a second state for giving an instruction as to operation of a prescribed device which is determined so as to correspond to a specific scene, and an outputter configured to output an instruction signal according to the first state or the second state selected by the processor when the manipulation display is manipulated. The processor is configured to select one of the first state and the second state in response to a specific manipulation performed on the manipulation display.

With this configuration of the present invention, it is possible to provide a switch, a device control method, and a program which have a function of giving an instruction as to the operation of a specific device and a function of giving an instruction as to the operation of a device corresponding to a specific scene.

DESCRIPTION OF EMBODIMENTS

First Embodiment

A switch described below includes a manipulation section configured to receive a manipulation performed by a user and an outputter configured to output an instruction signal for giving an instruction as to the operation of a device in response to an input signal resulting from the manipulation performed on the manipulation section. The device is capable of communicating with another device and has a function of receiving the instruction as to the operation from the another device and notifying the another device of an operation state of the device. A building is basically assumed to be a dwelling house. In the case where the building is a multiple residential dwelling complex, each of the plurality of dwelling units corresponds to the concept of the building in the present embodiment. The building is not limited to the dwelling house but may be a shop, an office, or the like.

The following description is directed to an example in which the building is a dwelling house and the device communicates with a controller (hereinafter referred to as an "HEMS controller") of a Home Energy Management System (HEMS). In this example, the switch transmits the instruction signal to the HEMS controller and gives an instruction about the operation of the device to the device via the HEMS controller. The switch is required only to be installed in at least one site in the dwelling house, but it is preferable to dispose a plurality of switches in a distributed manner at a plurality of sites in the dwelling house. Moreover, similarly to general wall switches, the switch is fixed to a wall of the dwelling house. Note that the switch may be detachable from the wall.

The device is required only to be configured to communicate with the HEMS controller so as to receive the instruction as to the operation from the HEMS controller and to be able to notify the HEMS controller of the operation state of the device. Examples of the device include an illumination device, an air conditioner, an Induction Heating (IH) cooking heater, a water heater, an electric shutter, an air purifier, a temperature and humidity sensor (a composite sensor of a temperature sensor and a humidity sensor), and a motion sensor. The positions of these devices are fixed in the building so that these devices are not displaced when being used. However, it is not essential that the relative position to the building is fixed. The device is required only to be a device used in the building and only to be a device such as a microwave oven, a refrigerator, or a television receiver used basically stationarily.

Figure 1:
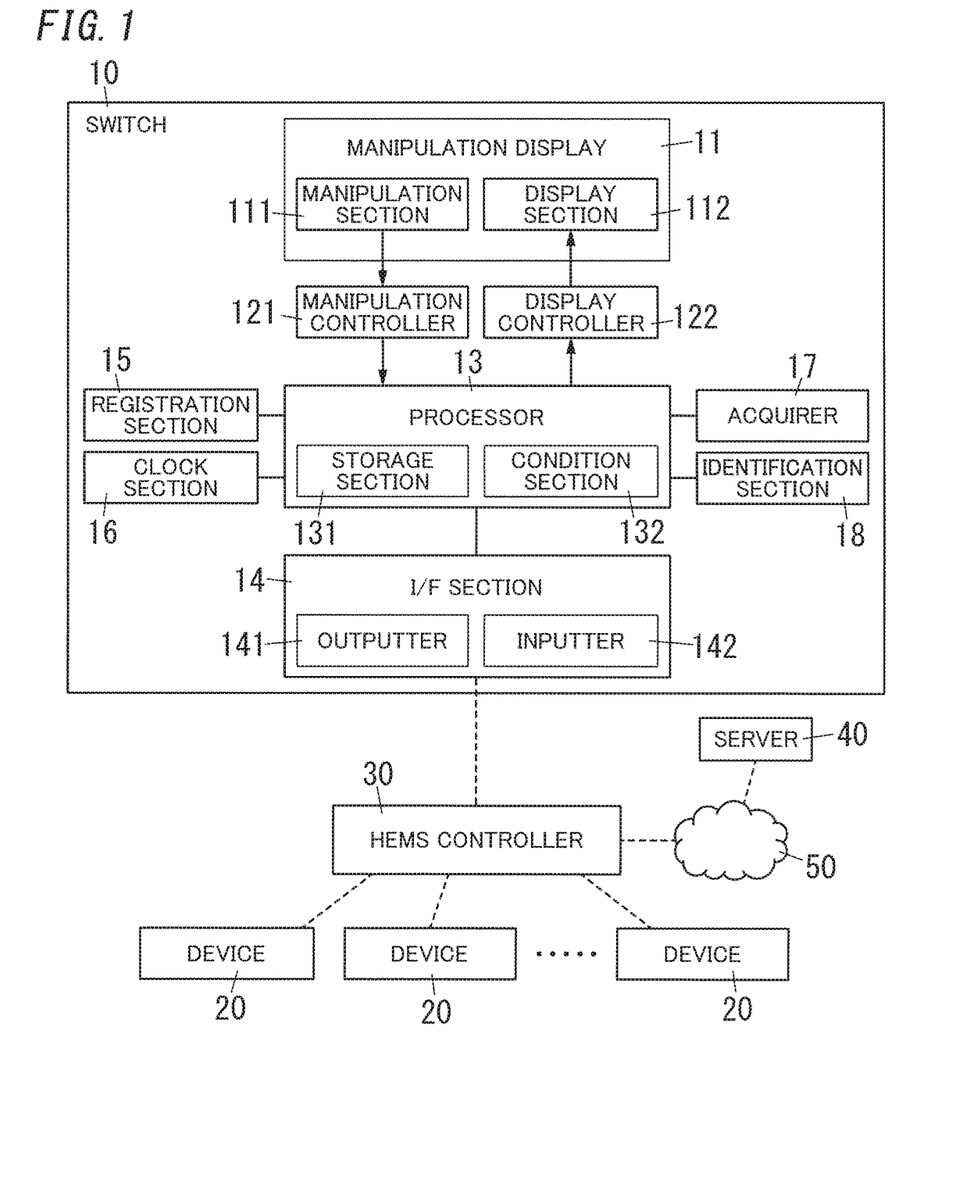
FIG. 1 is a block diagram illustrating a first embodiment.

As illustrated in FIG. 1, a switch 10 includes a manipulation display 11. The manipulation display 11 includes a manipulation section 111 and a display section 112. The switch 10 further includes a manipulation controller 121, a display controller 122, a processor 13, and an interface section 14. The interface section 14 includes an outputter 141 and an inputter 142. In the following description, the interface section is referred to as an "I/F section". The manipulation section 111 is electrically connected to the manipulation controller 121. The display section 112 is electrically connected to the display controller 122. The I/F section 14 has a communication function and is capable of communicating with an HEMS controller 30. Note that communication between the switch 10 and the HEMS controller 30 may be wireless communication or wired communication, or a combination of wireless communication and wired communication may be adopted to increase the reliability of the communication between the switch 10 and the HEMS controller 30. In the case of the wired communication, using a power line communication technique using an indoor distribution line also as a communication line eliminates the need for wiring an additional communication line and enables an installation work process to be omitted. Moreover, using the power line communication technique enables replacement of an existing switch with the switch 10 in a manner similar to replacement work of existing switches.

The manipulation controller 121 distinguishes between at least two types of manipulations performed on the manipulation section 111. One of the two types of manipulations is a manipulation of giving an instruction as to the operation of a device 20, and the other of the two types of manipulations is a manipulation of changing a display content in the display section 112. The manipulation controller 121 may be configured to distinguish another type of manipulation from these two types of manipulations, but in the present embodiment, the manipulation controller 121 is required only to be able to distinguish between the above-described two types of manipulations. Moreover, the display controller 122 receives a display signal indicating the display content from the processor 13 and displays the display content instructed by the processor 13 on the display section 112.

The processor 13 includes a storage section 131 configured to store data denoting a content (hereinafter referred to as an "instruction content") of the instruction signal in association with data denoting the display content of the display section 112. The instruction signal is output from the outputter 141 in response to a manipulation performed on the manipulation section 111 by a user. The storage section 131 stores a plurality of tuples of data, each tuple including the data denoting the instruction content and the data denoting the display content which are associated with each other In the following description, a tuple of data is referred to as a "data tuple". The processor 13 reads any of the plurality of data tuples from the storage section 131 and delivers the data denoting the display content in the data tuple which has been read to the display controller 122. The display controller 122 receives the display content and displays the display content in the display section 112. Moreover, when the manipulation section 111 is manipulated so as to give an instruction as to the operation to the device 20 and the processor 13 thereby receives an input signal from the manipulation controller 121, the processor 13 delivers the data denoting the instruction content associated with the data denoting the display content to the outputter 141. In this way, the outputter 141 outputs an instruction signal according to the display content.

When the manipulation section 111 is manipulated to change the display content of the display section 112, the manipulation controller 121 outputs a change signal instructing the processor 13 to change the display content. When receiving the change signal, the processor 13 reads a new data tuple from the storage section 131 in accordance with a prescribed condition. The processor 13 delivers data denoting a display content included in the data tuple which has been read to the display controller 122, and the display controller 122 changes the display content of the display section 112. In this state, when the manipulation section 111 is manipulated to give an instruction as to the operation of the device 20, the processor 13 delivers data denoting an instruction content according to the data tuple which has been read to the outputter 141, and the outputter 141 outputs an instruction signal according to the display content. The instruction signal output from the outputter 141 is transmitted to the HEMS controller 30, and the HEMS controller 30 controls the operation of the device 20 in accordance with the instruction signal.

The processor 13 of the switch 10 includes a device as a main hardware element, the device including a processor which operates in accordance with a program. As the device including the processor, a microcontroller integrally including memory or a microprocessor which is separately provided with memory is used. That is, the switch 10 includes a computer. Examples of the memory include rewritable nonvolatile memory (e.g., Electrically Erasable Programmable Read-Only Memory (EEPROM)) included in the storage section 131 in addition to Random Access Memory (RAM) used as work memory of the processor. The program is used to cause the computer to function as the switch 10. The program is stored in Read Only Memory (ROM) in advance, is provided by a recording medium such as a memory card readable by the computer, or is provided over an electronic communication network, such as the Internet. That is, a program for causing the computer to function as the processor 13 is provided.

Figure 2:
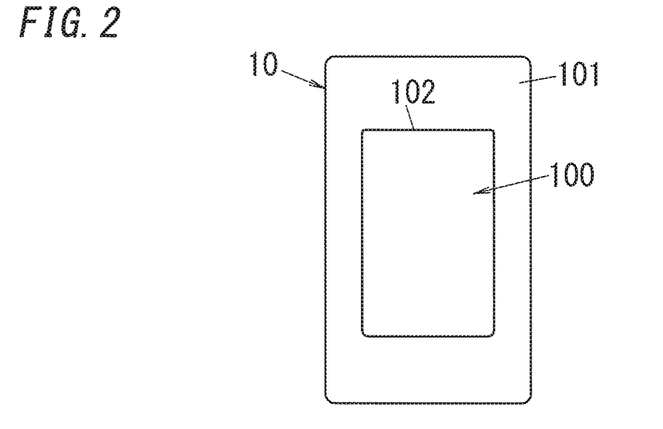
FIG. 2 is a front view illustrating a state where a first data tuple is selected in the first embodiment.

The configuration and operation of the switch 10 will be specifically described below. As illustrated in FIG. 2, the switch 10 includes a housing 100 to be attached to a wall surface or the like. The housing 100 has a similar appearance to a general wall switch. The switch 10 shown in the figure has an embedded configuration in which the switch 10 is to be attached to a wall with a rear portion of the housing 100 being embedded in an attachment hole formed in the wall. The housing 100 of embedded-type has a structure connectable to an attachment frame fixed to the wall. Such a structure is known and is realized by, for example, forming a hole in a side surface of the housing 100 so that the hole is to be connected to a pawl provided to the attachment frame. Alternatively, a hole may be formed in the frame, and a pawl may be provided to the side surface of the housing 100. The frame has a front surface covered with a decorative plate 101. The decorative plate 101 has a window 102 for exposing the front surface of the housing 100 and has a function of covering an edge of the attachment hole formed in the wall.

The manipulation display 11 is disposed at a site located in the front surface of the housing 100 and exposed from the window 102 of the decorative plate 101. The display section 112 includes flat-panel display. The manipulation section 111 includes a touch panel overlapping a screen of the display section 112. The display included in the display section 112 is used for graphic display and is selected from a liquid crystal display, an Organic Light Emitting Diode (OLED) display, and the like.

A manipulation of giving an instruction as to the operation of the device 20 to the manipulation section 111 is a manipulation of touching the manipulation section 111 with an object corresponding to a finger or a manipulation of tapping the manipulation section 111 with an object corresponding to a finger. Moreover, a manipulation of instructing the manipulation section 111 to change the display content is a manipulation of swiping an object corresponding to a finger in contact with the manipulation section 111 in the right and left direction (or in the upward and downward direction). The object corresponding to a finger is generally a finger, a touch pen, or the like.

The storage section 131 stores at least two types of data tuples. In the following description, terms "first data tuple" and "second data tuple" are used when the two types of data tuples are distinguished from each other. Each of the first data tuple and the second data tuple is a data tuple including data denoting a display content and data denoting an instruction content which are associated with each other. The number of data tuples stored in the storage section 131 is limited to one for the first data tuple but is not limited for the second data tuple.

The first data tuple corresponds to a specific device 20. The data denoting the instruction content in the first data tuple is directed to only the specific device 20, and the data denoting the display content is configured such that the display content of the display section 112 gives an impression similar to a handle of the wall switch, for example, as shown in FIG. 2. The specific device 20 is generally a device 20 which is fixedly associated with the switch 10 at the time of installation of the switch 10. That is, the data denoting the instruction content in connection with the manipulation performed on the manipulation section 111 is fixedly set in the storage section 131. The specific device 20 corresponds to, for example, an illumination device in a room in which the switch 10 is disposed. In other words, when the first data tuple is used, the switch 10 functions in a manner similar to the wall switch.

Figure 3A:
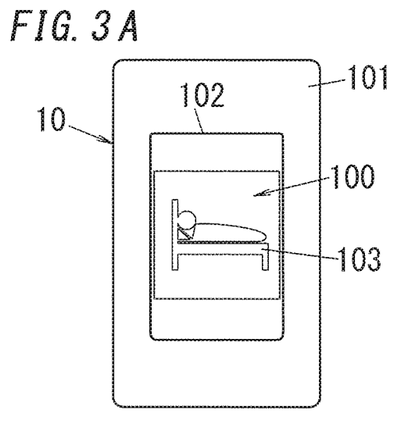
FIG. 3A is a front view illustrating an example corresponding to "going to bed" in a state where a second data tuple is selected in the first embodiment.
Figure 3B:
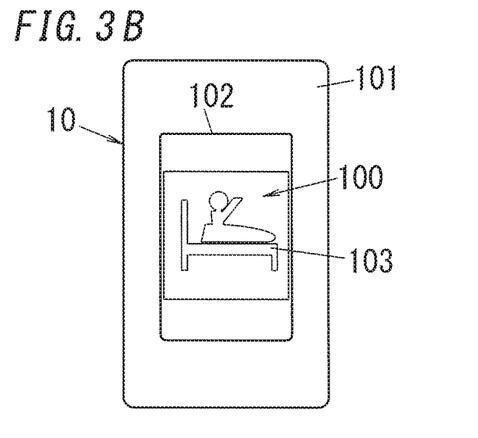
FIG. 3B is a front view illustrating an example corresponding to "wake-up" in a state where the second data tuple is selected in the first embodiment.
Figure 3C:
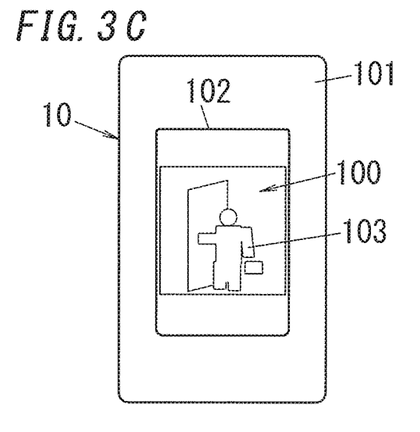
FIG. 3C is a front view illustrating an example corresponding to "coming home" in a state where the second data tuple is selected in the first embodiment.
Figure 3D:
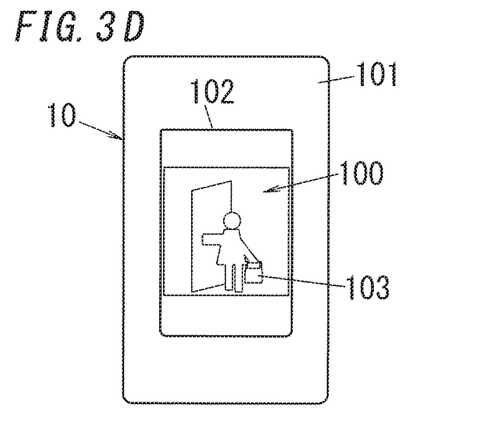
FIG. 3D is a front view illustrating an example corresponding to "coming home" in a state where the second data tuple is selected in the first embodiment.
Figure 3E:
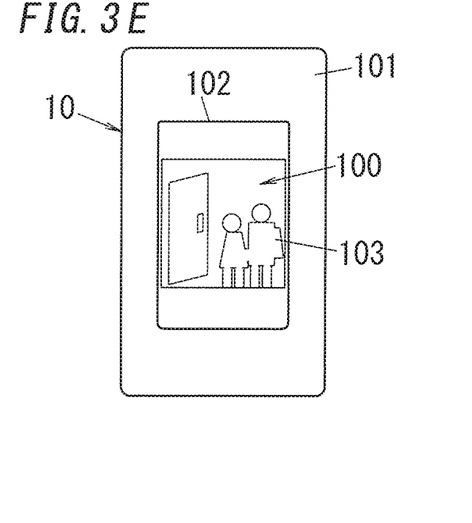
FIG. 3E is a front view illustrating an example corresponding to "going out" in a state where the second data tuple is selected in the first embodiment.

The second data tuple corresponds to a specific scene. The data denoting the display content in the second data tuple includes diagrams 103, for example, pictograms, as illustrated in, for example, FIGS. 3A to 3E. The display content in the second data tuple may be characters describing a function. The specific scene is mainly a live scene. The live scene is selected from, for example, going to bed, wake-up, coming home, and going out. FIG. 3A shows an example in which the display content denoted by the diagram 103 is the going to bed. FIG. 3B shows an example in which the display content denoted by the diagram 103 is the wake-up. FIG. 3C shows an example in which the display content denoted by the diagram 103 is the coming home of a father. FIG. 3D shows an example in which the display content denoted by the diagram 103 is the coming home of a child. FIG. 3E shows an example in which the display content denoted by the diagram 103 is the going out. In the storage section 131, the data denoting the instruction content in connection with the manipulation performed on the manipulation section 111 is determined in accordance with the specific scene. In the second data tuple, the relationship between the switch 10 and the device 20 is not fixed but is changeable, and the second data tuple is stored in the storage section 131 after the installation of the switch 10. It is not essential that the specific scene corresponds to the live scene. A scene for controlling the operation of the device 20 to increase concentration, a scene for controlling the operation of the device 20 for relaxation, or the like may be associated with the switch 10.

In the second data tuple, the data denoting the instruction content may be determined so that the operations of a plurality of devices 20 are collectively controlled. When the data denoting the instruction content in the second data tuple is directed to the plurality of devices 20, the instruction content includes not only the types of the devices 20 but also information regarding a content of the operation of each device 20, a sequential order for giving the instruction as to the operation to the plurality of devices 20, and the like. When the processor 13 selects the second data tuple, the switch 10 can collectively control the operations of the plurality of devices 20 in accordance with the live scene. Moreover, when the processor 13 selects the second data tuple, the switch 10 can control the operations of the devices 20, which are not the devices 20 fixedly associated in the first data tuple, in accordance with the live scene.

Moreover, the switch 10 may store a plurality of second data tuples in the storage section 131. When the plurality of second data tuples are stored in the storage section 131, the processor 13 selects one second data tuple in accordance with a prescribed condition, and based on the second data tuple which has been selected, the processor 13 determines the display content of the display section 112 and the instruction content to the device 20 in connection with the manipulation performed on the manipulation section 111. The condition for selecting the data topic includes a manipulation input from the manipulation section 111, a place, a time, information acquired through communication, and a person who manipulates the switch 10. These conditions may be used individually or in combination to select a data tuple.

The processor 13 includes a condition section 132 configured to store a rule determining which data tuple is selected when the condition is satisfied. When the condition stored in the condition section 132 is satisfied, the processor 13 extracts a data tuple corresponding to the condition from the storage section 131 and determines the instruction content in connection with the manipulation performed on the manipulation section 111 and the display content of the display section 112.

The switch 10 shown in FIG. 1 has a configuration example in which all the above-described conditions can be used. That is, the switch 10 includes a registration section 15 in which places are registered, a clock section 16 which counts the date and time, an acquirer 17 configured to acquire information through communication, and an identification section 18 configured to recognize an approaching person and to identify the person. The identification section 18 may be omitted.

A name relating to the specific device 20 to which the first data tuple is directed is registered in the registration section 15. In the present embodiment, since the switch 10 is disposed in the dwelling house, the name registered in the registration section 15 is basically the name of a room or a place in which the specific device 20 is disposed, and, for example, names such as "living room", "bedroom", and "corridor" are registered in the registration section 15.

Note that in the registration section 15, the name of the device 20 may also be added to the name of the room or the place. For example, when two types of illumination devices for main illumination and spot illumination are disposed in a living room, and different switches 10 correspond to the illumination device for the main illumination and the illumination device for the spot illumination, the names of the devices 20 are registered in the registration section 15 in addition to the name of the place. In general, the names are registered in the registration section 15 at the time of installation of the switch 10. That is, at the time of registration of the first data tuple in the storage section 131, the name is also registered in the registration section 15.

The clock section 16 includes a real-time clock. The clock section 16 is capable of outputting information regarding the day of the week, holidays, and the like in addition to the date and the time, Thus, the rule stored in the condition section 132 may have these pieces of information as conditions. The rule which includes the time as a condition uses, in one case, the time alone as the condition, and uses, in the other case, a combination of the time and the place as the condition. Moreover, the rule which has the place as a condition uses a condition combined with the time.

The acquirer 17 communicates with the HEMS controller 30 to acquire information regarding a manipulation performed on another switch 10, information regarding the operation of the device 20, information detected by a sensor, and the like. The information regarding a manipulation performed on another switches 10 is, for example, information regarding whether the switch 10 is on or off, or in the case of the switch 10 configured to dim or to perform color adjustment of the light of the illumination device, the information regarding operations given to another switches 10 is, for example, information regarding a dimming state or a color adjustment state. The information regarding the operation of the device 20 is, for example, information regarding whether the device 20 is on or off, or in the case of the device 20 being an air conditioner, the information regarding the operation of the device 20 is, for example, information regarding a set temperature. The information detected by the sensor is information regarding a room temperature in the case of the sensor being a temperature sensor configured to measure the room temperature. The information detected by the sensor is information regarding an outdoor temperature in the case of the sensor being a temperature sensor configured to measure the outdoor temperature.

The identification section 18 can use biometric authentication such as fingerprint authentication. The identification section 18 may adopt a technique for communicating with a smartphone or a tablet terminal to recognize an approaching person and to identify the person. For example, performing communication limited to a near distance between a smartphone or a tablet terminal and the switch 10 enables identification of the smartphone or the tablet terminal existing in a range for manipulating the switch 10. Registering information specifying the smartphone or the tablet terminal in the identification section 18 in advance enables the identification section 18 to identify an owner of the smartphone or the tablet terminal through communication with the smartphone or the tablet terminal. Note that the communication in a near distance is realized by using a communication technique, for example, Bluetooth (registered trademark) Low Energy (LE), When such a communication technique is used, an indoor positioning system is established to specify the location of the smartphone or the tablet terminal in the dwelling house.

The processor 13 has a function of setting the instruction content as described above by using the manipulation display 11 as a man-machine interface. That is, a user can use the manipulation display 11 to set which device 20 is associated with which scene and how the device 20 is operated. The instruction content which has been set is stored in the storage section 131. The processor 13 further has a function of editing the instruction content stored in the storage section 131 by using the manipulation display 11 as a man-machine interface.

The processor 13 is configured to enable a user to register and edit a condition to be set in the condition section 132, a name to be registered in the registration section 15, and the like in addition to the instruction content to be stored in the storage section 131 by using the manipulation display 11 as a man-machine interface. The processor 13 may further have a function of adding the name of the specific device 20 which is a target of the first data tuple, a function of selecting a color of a screen of the display section 112, and the like.

Data (i.e., data of a display content) of the diagram 103 associated with the instruction content in the second data tuple is only required to be acquired from a server 40 which communicates with the HEMS controller 30 over an electronic communication network 50 such as the Internet. Pieces of data of various types of diagrams 103 (display contents) according to scenes in which the operation of the device 20 is expected to be controlled are prepared in the server 40. Thus, a user selects a preferred piece of data by manipulating the manipulation display 11, thereby enabling association of the instruction content with the display content. Various components for forming the diagram 103 for similar types of scenes may be registered in the server 40. In this case, a user can combine the components to create a preferred diagram 103 and to provide an entertaining property to the switch 10.

An operation example of the switch 10 in the present embodiment will be described below. As described above, in a state (first state) where the first data tuple is selected, an instruction content corresponding to the manipulation section 111 and a display content of the display section 112 are determined so that the operation of the specific device 20 is controlled. In the first data tuple, for example, a device 20 such as an illumination device is specified as a target, and the instruction content is determined such that on or off of the device 20 is selected by a manipulation of touching or tapping the manipulation section 111. Moreover, as illustrated in FIG. 2, the display content of the display section 112 is determined such that the display section 112 looks like a general wall switch.

In this example, the instruction content is determined such that a state of the operation of the device 20 is a condition such that when the device 20 is off, a manipulation performed on the manipulation section 111 turns on the device 20, whereas when the device 20 is on, a manipulation performed on the manipulation section 111 turns off the device 20. That is, the instruction content is determined so as to achieve so-called alternate operation (operation of a push on/push off type push-button switch). Note that the switch 10 may have a function of giving instructions as to light output, colors of light, and the like to the illumination device, and may have a function of giving instructions as to a temperature, a wind speed, a wind direction, and the like to an air conditioner. When the switch 10 has these functions, the display content may be determined such that a dial or a slider for adjustment is displayed in the display section 112. In this case, the first data tuple may be determined so as to enable a manipulation of turning the dial or a manipulation of sliding the slider.

In contrast, in a state (second state) where the second data tuple is selected, the instruction content corresponding to the manipulation section 111 and the display content of the display section 112 are determined so as to control the operation of one or a plurality of devices 20 selected to correspond to the specific scene. In the second data tuple, in order to realize control corresponding to a scene of, for example, going to bed, the instruction content is determined such that a manipulation of touching or tapping the manipulation section 111 collectively turns off the plurality of devices 20 disposed in the living room. The plurality of devices 20 disposed in the living room are an illumination device, a television set, and an air conditioner, and the like. Moreover, as illustrated in each of FIGS. 3A to 3E, the display, content is determined such that the diagram 103 such as a pictogram reminding of a scene is displayed in the display section 112.

The device which is to be associated with the manipulation performed on the manipulation section 111 is not limited to the device 20 in one room but may include devices 20 in another place. For example, when the operations of the devices 20 in the living room are collectively controlled as in the above-described example, the instruction content may be determined such that another device 20, for example, a water heater for a bathroom is also turned off. Moreover, in this example, the instruction content is determined such that the devices 20 are simultaneously turned off, but the instruction content may be determined such that timings for turning off the devices 20 are shifted with respect to each other. For example, when a device 20 in the living room and an illumination device at the stairs are collectively turned off, the instruction content may be determined such that the illumination device at the stairs is turned off after a predetermined time long enough for a person to pass through the stairs has elapsed since the device 20 in the living room was turned off.

The first data tuple is determined so as to change the instruction content of the operation of the device 20 in connection with the manipulation performed on the manipulation section 111 with a state of the operation of the specific device 20 being used as a condition. Thus, when the first data tuple is selected, the manipulation section 111 may be repeatedly manipulated. In contrast, the second data tuple determines the instruction content corresponding to a specific scene. Thus, when the second data tuple is selected, the manipulation section 111 is manipulated only once, and the manipulation ends when control corresponding to the instruction content is realized.

A state (first state) for selecting the first data tuple and a state (second state) for selecting the second data tuple may be switched by a user touching a screen of the manipulation display 11. In the present embodiment, the state (first state) for selecting the first data tuple and the state (second state) for selecting the second data tuple may be switched by a user performing a swipe manipulation on the screen of the manipulation display 11.

Here, an example will be described in which two types of second data tuples corresponding to two types of live scenes, "coming home" and "going to bed", are stored in the storage section 131. It is also assumed that the processor 13 selects the second data tuple corresponding to "coming home" at the time of coming home and selects the second data tuple corresponding to "going to bed" at the time of going to bed on the basis of conditions set in the condition section 132. That is, a state is assumed where the diagram 103 as shown in FIG. 3C or 3D is displayed on the manipulation display 11 of the switch 10 disposed near an entrance when a user comes home, and the diagram 103 as shown in FIG. 3A is displayed on the manipulation display 11 of the switch 10 disposed in the bedroom when the user goes to bed.

In this case, a user manipulates (touches or taps) the switch 10 disposed near the entrance when the user comes home to enable the operation of the device 20 to be controlled with the instruction content corresponding to the "coming home". Moreover, the user manipulates the switch 10 disposed near the bedroom when the user goes to bed, thereby enabling the operation of the device 20 to be controlled with the instruction content corresponding to the "going to bed".

The instruction content corresponding to the "coming home" determines that devices 20 serving as control targets are turned on, where the devices 20 serving as the control targets are an illumination device in an entrance hall, an illumination device in the living room, a television set in the living room, and an air conditioner in the living room. Moreover, the order of turning on the devices 20 can be determined by the instruction content and is determined, for example, such that the illumination device in the entrance hall, the illumination device in the living room, the television set in the living room, and the air conditioner in the living room are turned on in this order. Note that in the instruction content, it is not essential to determine the order of turning on the plurality of devices 20 serving as control targets, and, for example, it is also possible to determine the instruction content such that the plurality of devices 20 are simultaneously turned on.

Moreover, by the instruction content corresponding to the "going to bed", for example, turning off of a plurality of devices 20 serving as control targets is determined, where the plurality of devices 20 serving as the control targets are an illumination device in the living room, a television set in the living room, a water heater for the bathroom, and an air conditioner in the living room. The order of turning off the devices 20 may be determined by the instruction content and is determined, for example, such that the illumination device in the living room, the television set in the living room, the water heater for the bathroom, and the air conditioner in the living room are turned off in this order. It is not essential to determine the order of turning off the devices 20 serving as the control targets in the instruction content, and for example, by the instruction content, simultaneous turning off of the plurality of devices 20 may be determined.

When a user wishes to control the operation of the specific device 20 but not the instruction content corresponding to the "coming home" or the "going to bed", the user performs a swipe manipulation on the screen of the manipulation display 11 to select the first data tuple. That is, the swipe operation causes the manipulation display 11 to show the display content as shown in FIG. 2, and it becomes possible to give an instruction as to the operation to only the specific device 20 as a target.

Here, the following conditions are determined in the condition section 132. For example, it is assumed that second data tuples corresponding to three types of scenes, "wake-up", "coming home", and "going to bed" are stored in the storage section 131, In this case, the conditions set in the condition section 132 are determined by using a place registered in the registration section 15, a time clocked by the clock section 16, and information which relates to the manipulation performed on the switch 10 near the entrance and which is acquired by the acquirer 17 through the HEMS controller 30.

The time is used as a condition for selecting the second data tuple corresponding to the "wake-up". For example, the processor 13 selects the second data tuple corresponding to the "wake-up" by using a time period, for example, from 3 a.m. to 9 a.m. as the condition.

The time and the information relating to the manipulation performed on another switch 10 are used as conditions for selecting the second data tuple corresponding to the "coming home". For example, after a manipulation corresponding to the "going out" is performed on the switch 10 disposed near the entrance, the processor 13 selects the second data tuple corresponding to the "coming home" by using a time period, for example, from 6 p.m. to 10 p.m. as the condition. Performing the manipulation corresponding to the "going out" on the switch 10 disposed near the entrance means that in a state (second state) where the second data topic corresponding to the "going out" is selected, the switch 10 is manipulated to turn off the devices 20 when a user goes out.

The time and the information relating to the operation of the device 20 are used as conditions for selecting the second data tuple corresponding to the "going to bed". For example, the processor 13 assumes that a dweller comes home if a prescribed device 20 is turned on in a predetermined time zone set as a condition of the "coming home", and the processor 13 selects the second data tuple corresponding to the "going to bed" on condition of this event and that it is later than 9 p.m.

The examples of the above-described conditions are mere examples, are not limitative, and the above-described conditions are accordingly determined in accordance with the life of a dweller in the dwelling house. In the examples described above, the second data tuple is automatically selected when the conditions are satisfied, and the diagram 103 of any one of the FIGS. 3A to 3E is displayed on the manipulation display 11. In this state, a swipe manipulation is performed on the manipulation display 11 to select the first data tuple and to switch the display to the display content as shown in FIG. 2, so that the operation of only a specific device 20 associated with the switch 10 can be controlled.

Here, the processor 13 can acquire information detected by the sensor from the HEMS controller 30 through the acquirer 17 to use the information as a condition for selecting the second data tuple and to change the instruction content of the device 20 by using the information. That is, in accordance with the information detected by the sensor, the display content of the manipulation display 11 can be changed, and the instruction content to the device 20 in the case of manipulating the manipulation display 11 can be changed.

For example, it is assumed that a dweller is taking a bath at the time of manipulating the manipulation display 11 in a state (second state) where the second data tuple corresponding to the "going to bed" is selected. In the example of the instruction content corresponding to the "going to bed" described above, the water heater for the bathroom is included in the devices 20 serving as control targets. Thus, the water heater for the bathroom is turned off when the manipulation display 11 is manipulated. In contrast, a condition is determined such that when a motion sensor in the bathroom detects a person, the water heater for the bathroom is excluded from the targets to be turned off even when the manipulation display 11 is manipulated in a state corresponding to the "going to bed", thereby preventing inconvenience under which the dweller taking a bath would otherwise suffer.

Moreover, it is assumed that information regarding the room temperature in the living room has been acquired from the temperature sensor at the time of manipulating the manipulation display 11 in a state (second state) where a second data tuple corresponding to the "coming home" is selected. In the instruction content corresponding to the above-described "coming home", the air conditioner in the living room is included in the devices 20 serving as control targets, and therefore, the air conditioner in the living room is turned on when the manipulation display 11 is manipulated. In contrast, a condition can be determined such that when the room temperature in the living room detected by the temperature sensor is within a prescribed temperature range, the air conditioner in the living room is excluded from the target to be turned on even when the manipulation display 11 is manipulated in a state corresponding to the "coming home". When such a condition is determined, the air conditioner in the living room is not unnecessarily turned on in response to the manipulation in connection with the "coming home", which leads to energy saving.

When the identification section 18 is provided, it becomes possible to identify a person who manipulates the switch 10 and to change at least one of the display content and the instruction content of the manipulation display 11 according to the person. Here, it is assumed that the identification section 18 is configured to detect approximation of a smartphone and to perform near-distance communication with the smartphone to identify an owner of the smartphone. Moreover, a case is assumed where the second data tuple corresponding to "coming home" is selected and different second data tuples for coming home of a father and corning home of a child are stored in the storage section 131.

In this case, when the identification section 18 of the switch 10 disposed near the entrance detects approximation of a smartphone and identifies an owner of the smartphone, the processor 13 selects a second data tuple corresponding to the owner. This operation enables the device 20 to be controlled, at the time of the coming home, depending on a person who manipulates the switch 10. In this operation, the switch 10 disposed near the entrance is configured to usually be in a state (first state) where the first data tuple is selected, wherein when the smartphone approaches the switch 10, the switch 10 transitions to a state (second state) where the second data tuple corresponding to the owner is selected.

Moreover, in the state (second state) where the second data tuple is selected, when the smartphone is no longer detected, the processor 13 preferably automatically returns to the state (first state) where the first data tuple is selected.

Note that since the event "coming home" occurs only after the event "going out", the processor 13 may select the second data tuple corresponding to the "coming home" on condition that the "going out" is assumed. The "going out" may be assumed on condition that, for example, a state where the motion sensor disposed in the dwelling house does not detect a person lasts for a predetermined time period (e.g., 1 hour) after the switch 10 disposed near the entrance is manipulated.

The above-described operation example has been described as to the condition for selecting the second data tuple, but the state (first state) for selecting the first data tuple and the state (second state) for selecting the second data tuple may be determined in accordance with conditions. For example, the processor 13 can separate the state (first state) for selecting the first data tuple from the state (second state) for selecting the second data tuple with a time zone being used as a condition. Moreover, the processor 13 may be configured such that after the manipulation display 11 is manipulated in a state (second state) where the second data tuple is selected, the state (second state) transitions to the state (first state) for selecting the first data tuple.

As described above, the present embodiment controls the device 20 by means of the switch 10 and the HEMS controller 30, wherein the switch 10 and the HEMS controller 30 establish the device control system. Moreover, to the device control system, the server 40 may be added, and adding the server 40 facilitates provision of data and the like regarding the display content of the display section 112. Note that the server 40 described above includes one computer but may include a plurality of computers. Moreover, the server 40 may be a cloud computing system.

Here, the display of the display section 112 may be turned off during a time period other than a time period during which a person manipulates the switch 10. In particular, when a liquid crystal display or an OLED display is used as the display section 112, turning off of the display suppresses an increase in power consumption. When the display section 112 is displayed only when the switch 10 is manipulated, the switch 10 preferably has a function of detecting an approximation of a person. Note that during the time period except for the time period during which a person manipulates the switch 10, the display section 112 may display the same image as a surrounding wall. In this way, the switch 10 can be presented as if the switch 10 is integrated with the wall.

Thus, a configuration may be adopted in which the switch 10 is provided with a motion sensor, and during a time period during which the motion sensor does not detect an approximation of a person to the switch 10, the display of the display section 112 is turned off. In this configuration, only during the time period during which the motion sensor detects the presence of a person in the proximity of the switch 10, the display content selected by the processor 13 is displayed in the display section 112. Thus, power consumption is more reduced in this configuration than in a configuration in which the display section 112 performs constant display. The motion sensor may be provided separately from the switch 10. In this case, a configuration may be adopted in which the switch 10 is notified of the approximation of a person to the switch 10 via the HEMS controller 30.

Note that as the display section 112, electronic paper configured not to consume electric power during the display may be used. In this case, it becomes difficult to virtually recognize the display content of the display section 112 when the surroundings of the display section 112 are dark. Therefore, the switch 10 is preferably provided with a brightness sensor configured to monitor the brightness of the surroundings and a lamp such as an LED lamp which is turned on when the brightness monitored by the brightness sensor is lower than or equal to the reference value.

In this configuration, in the daytime during which the surroundings of the switch are bright, power for display in the display section 112 is not consumed, whereas in the nighttime during which the surroundings of the switch are dark, the lamp is turned on so that a user can visually recognize the display section 112. Moreover, when the motion sensor is combined with this configuration, the lamp is off during a period during which a user does not manipulate the switch 10 even in the nighttime, thereby enabling suppression of an increase in power consumption.

That is, the device control system f the present embodiment includes the switch 10 and the controller (HEMS controller 30) configured to communicate with a device disposed in a building (dwelling house). Moreover, through communication of the switch 10 with the controller (HEMS controller 30), the switch 10 transmits an instruction signal to the device 20 through the controller (HEMS controller 30).

With this configuration, the switch 10 of the present embodiment controls the device 20 in cooperation with the HEMS controller 30.

Second Embodiment

Figure 4:
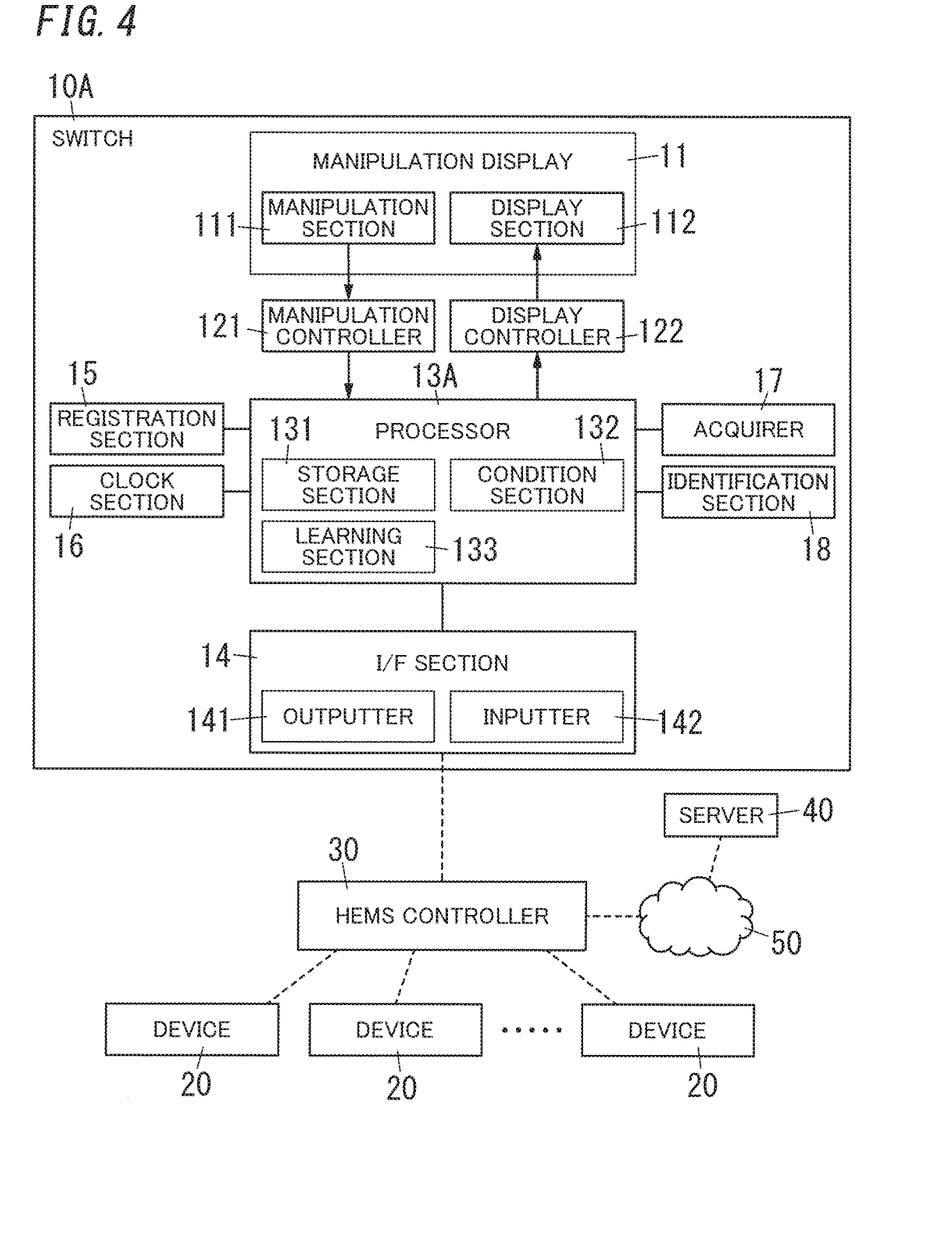
FIG. 4 is a block diagram illustrating a second embodiment.

In the first embodiment, a configuration in which a user sets the second data tuple is taken as an example. In the present embodiment, an example of automating generation of a second data tuple stored in a storage section 131 will be described with reference to FIG. 4. In general, instructions Oven as to which device 20 and which operation of the device 20 in a live scene of a user depend on the device 20 used in a dwelling house in which a switch 10A is installed, the lifestyle of the user, and the like. Thus, a processor 13A of the present embodiment includes a learning section 133. The learning section 133 stores operation history of the device 20 by a user, analyzes the stored operation history to extract a pattern of which device 20 is controlled in which manner and in which live scene, and stores the extracted pattern as the second data tuple in the storage section 131.

Similarly to the first embodiment, "coming home" and "going to bed" are taken as examples to describe operation of the learning section 133. It is assumed that in the storage section 131 of the switch 10A, only a first data topic is set, but the second data tuple is not set.

Now, it is assumed that through communication with a HEMS controller 30, the learning section 133 acquires through an inputter 142, operation history that devices 20 serving as an illumination device in an entrance hall, an illumination device in a living room, a television set in the living room, and an air conditioner in the living room were turned on in this order within a predetermined time period. Moreover, it is assumed that through the HEMS controller 30, the learning section 133 acquires operation history that devices 20 serving as the illumination device in the living room, the television set in the living room, a water heater of a bathroom, and the air conditioner in the living room were turned off in this order within the predetermined time period. Here, the predetermined time period is selected within a range, for example, from 5 minutes or longer to 30 minutes or shorter, preferably a range from 10 minutes or longer to 15 minutes or shorter. The learning section 133 stores such operation history together with the date and time counted by a clock section 16.

When operation history corresponding to a predetermined number of days has been accumulated in the learning section 133, the learning section 133 evaluates the operation history to extract a pattern from the operation history. A rule based on which the operation history is to be evaluated may be determined accordingly. For example, the learning section 133 may evaluate the similarity of the operation history based on the following rule.

When the learning section 133 evaluates the similarity of the operation history, a plurality of devices 20 which have been turned on or off within the predetermined time period in the same time zone are defined as a group of devices on the basis of the operation history. It can be said that the group of devices is a set of a plurality of devices 20 which are highly possibly turned on or off in a specific scene.

The learning section 133 compares types of the plurality of devices 20 defined as the group of devices and evaluates whether or not the group of devices includes the same type of devices 20. When the group of devices defined daily on the basis of the operation history for the predetermined number of days includes only the same type of devices 20, and the operations (on or off) of the devices 20 are the same, the devices 20 included in the group of devices can be assumed to be devices 20 to be turned on or off collectively. When the group of devices has the pattern as described above, the learning section 133 adopts the devices 20 included in the group of devices and the operation of the devices 20 as a candidate for an instruction content in the second data tuple.

Note that the predetermined number of days is selected within a range from about one week to about one month. When the number of days is small, variations may occur due to a difference of weather, day of the week, and the like, whereas when the number of days is large, variations may occur due to the seasonality. Thus, the predetermined number of days is preferably about two weeks determined in consideration of day of the week.

Here, the order of operation of the plurality of devices 20 included in the group of devices is preferably the same, but even when the order of operation of some of the devices is changed, the learning section 133 adopts the devices 20 included in the group of devices and the operation of the devices 20 as candidates of the same data tuple as long as the same devices 20 (the same type of devices 20) are included in the group of devices. For example, even when there are days on which the television set in the living room is turned on and then the air conditioner in the living room is tuned on at the time of the coming home and days on which the air conditioner in the living room is turned on and then the television set in the living room is turned on at the time of the coming home, the learning section 133 handles the devices 20 included in the group of devices and the operation of the devices 20 as the same data tuple. Note that when the order of operation of the devices 20 is added to the instruction content in the second data tuple, an order obtained in a majority of the predetermined number of days may be adopted as the instruction content.

A display content in the second data tuple may be automatically determined on the basis of the time zone in which the candidate of the instruction content is extracted. For example, it is possible to prepare pieces of data of the display content corresponding to typical live scenes in a server 40 or the HEMS controller 30 and to read data of the display content corresponding to a live scene from the server 40 or the HEMS controller 30 on the basis of the time zone. Note that it is desirable that the display content be selectable by preference of a user.

An operation example of the learning section 133 will be described below. Now, it is assumed that the illumination device in the entrance hall, the illumination device in the living room, the television set in the living room, and the air conditioner in the living room are defined as devices 20 which are control targets, operation history of turning on of all these devices 20 exists, and the learning section 133 extracts these devices 20 as a group of devices. When such a group of devices is extracted for the above-described predetermined number of days, the learning section 133 assumes that the operation of each device 20 relates to the "coming home", and the learning section 133 stores the operation of the extracted group of devices as data of an instruction content corresponding to the "coming home" in the storage section 131. Moreover, the learning section 133 reads data of a diagram 103 corresponding to the "coming home" from the server 40 or the HEMS controller 30 and stores as data of the display content corresponding to the "coining home" in the storage section 131.

Moreover, it is assumed that the illumination device in the living room, the television set in the living room, the water heater of the bathroom, and the air conditioner in the living room are devices 20 serving as control targets, operation history of turning off of all these devices 20 exists, and the learning section 133 extracts these devices 20 as a group of devices. Similarly to the case of the "corning home", when the learning section 133 extracts the group of devices as described above for the predetermined number of days, the learning section 133 estimates that the operation of the devices 20 relates to the "going to bed". That is, the operation of the extracted group of devices is stored in the storage section 131 as data of the instruction content corresponding to the "going to bed", Moreover, data of the display content corresponding to the "going to bed" is registered in the storage section 131.

When the learning section 133 extracts a group plurality of devices relating to "wake-up" from operation history, a time zone is taken into consideration. For example, the learning section 133 extracts devices 20 to which an instruction as to the operation is given within a predetermined time (e.g., 10 minutes) from a point in time when a device 20 to which an instruction as to the operation is first given at or after a predetermined early-morning time (e.g., 3 a.m.) as a group of devices. In this way, the group of devices extracted by the learning section 133 is assumed to be devices 20 corresponding to the "wake-up".

In a similar manner, also when the learning section 133 extracts a group of devices relating to the "going to bed" from operation history, the time zone is preferably taken into consideration. In this case, when turning on of the devices 20 is not instructed for a predetermined time period (e.g., 1 hour) after turning off of the devices 20 is instructed at or after a predetermined nighttime (e.g., 9 p.m.), the devices 20, to which the turning off has been instructed, are assumed to be a group of devices corresponding to the "going to bed".

The process of the above-described learning section 133 is a mere example, and the rule based on which the learning section 133 evaluates the operation history may be accordingly determined. In particular, when a group of devices is extracted, using information of a device 20 to which an instruction as to the operation is given at the earliest time point in the group of devices or information of a device 20 to which an instruction as to the operation is given at the latest time point in the group of devices may enable the second data tuple to be more appropriately set. Moreover, addition of information detected by a sensor during operation of the devices 20 may also enable the second data tuple to be more appropriately set.

For example, in the first embodiment, in a state (second state) where the second data tuple corresponding to the "coming home" is selected, operation of excluding the air conditioner in the living room from the target devices to be turned on on the basis of the room temperature sensed by the temperature sensor is performed. In relation to this operation, information regarding a room temperature sensed by the temperature sensor in advance may be included, into a rule stored in the condition section 132, and a second data tuple corresponding to the room temperature may be registered in the storage section 131. In this case, the second data tuple may include the set temperature of the air conditioner. Moreover, a temperature at which the air conditioner is turned on for the "coming home", a set temperature of the air conditioner, or the like may be automatically determined by learning by the learning section 133.

As described in the first embodiment, the first data tuple and the second data tuple set in the storage section 131 can be edited by a user by means of the manipulation display 11. Thus, the second data tuple generated by the learning section 133 can also be edited by a user. The other configurations and operation are similar to those of the first embodiment.

Note that in the first embodiment and the second embodiment, the switch 10 (10A) communicates with the HEMS controller 30 and controls the device 20 via the HEMS controller 30. In contrast, the switch 10 (10A) may be configured to communicate directly with a device 20 disposed in a dwelling house without using the HEMS controller 30. Moreover, a configuration in which the switch 10 (10A) communicates with a device 20 through an access point of a wireless Local Area Network (LAN) but not the HEMS controller 30 may be adopted.

Third Embodiment

Figure 5:
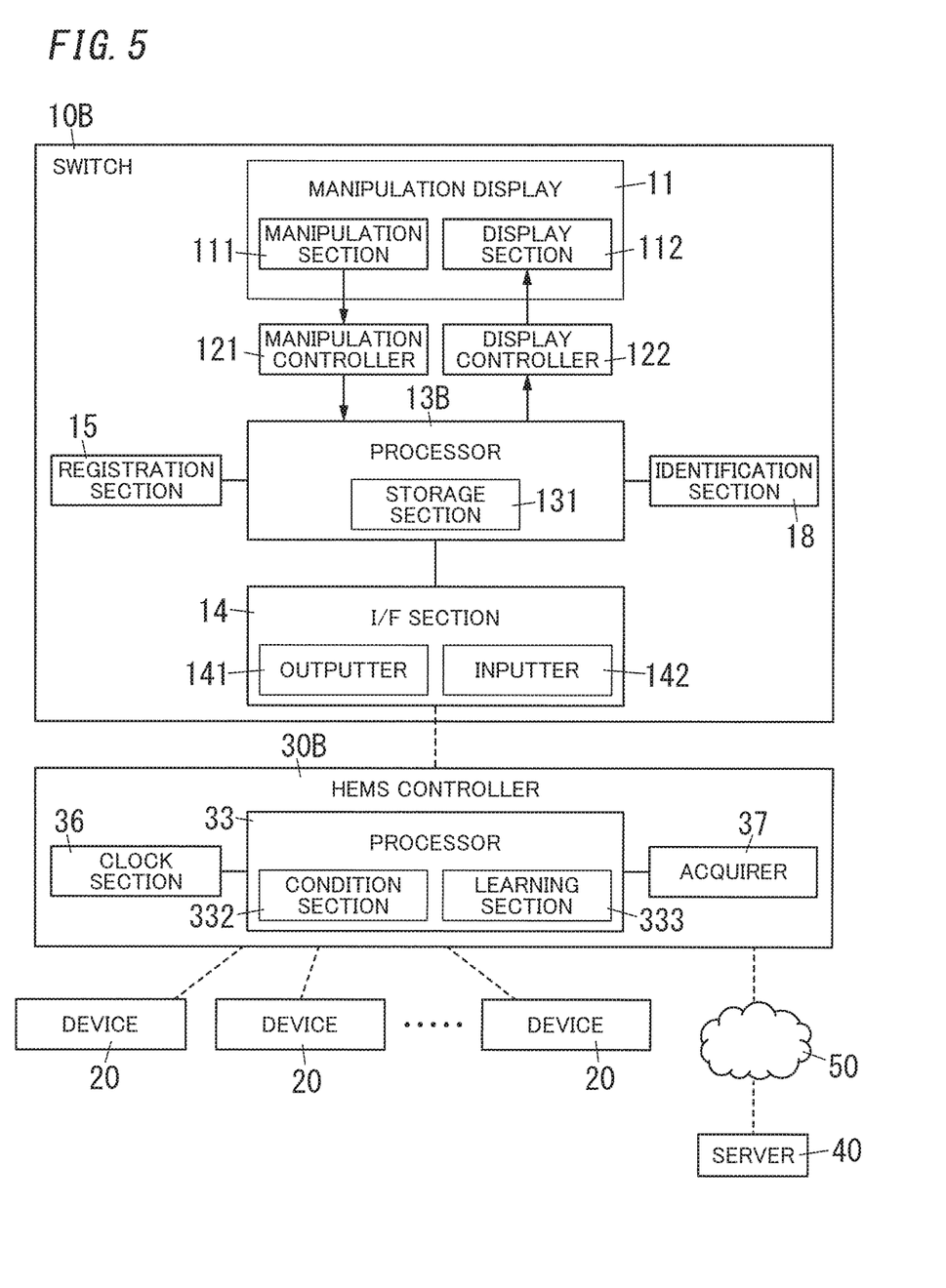
FIG. 5 is a block diagram illustrating a third embodiment.

In the second embodiment, the switch IDA includes the learning section 133, but the learning section 133 has a relatively large process load, and therefore, as illustrated in FIG. 5, the present embodiment shows an example of a HEMS controller 30B provided with a learning section 333. Moreover, in the present embodiment, the HEMS controller 30B includes a condition section 332 in which a rule for selecting a second data tuple is set. That is, the HEMS controller 30B has a processor 33 including the condition section 332 and the learning section 333. Moreover, the HEMS controller 30B includes a clock section 36 having a function corresponding to the clock section 16 and an acquirer 37 having a function corresponding to the acquirer 17. A switch 10B of the present embodiment has a configuration in which the clock section 16 and the acquirer 17 of the switch 10A shown in the second embodiment are omitted. Moreover, the switch 10B has a processor 13B having a configuration in which the condition section 132 and the learning section 133 of the processor 13A of the switch 10A of the second embodiment are omitted.

The processor 13B of the switch 10B and the processor 33 of the HEMS controller 30B each include as a main hardware element, a device including a processor configured to operate in accordance with a program. That is, similarly to the processor 13 of the switch 10 of the first embodiment and the processor 13A of the switch 10A of the second embodiment, the processor 13B includes a computer including a microcontroller, a microprocessor, or the like. Thus, a program for causing the computer to function as the processor 13B is provided.

The condition section 332 of the present embodiment functions in a similar manner to the condition section 132 of the second embodiment, and the learning section 333 of the present embodiment functions in a similar manner to the learning section 133 of the second embodiment. Thus, the overall operation of a device control system including the switch 10B and the HEMS controller 30B of the present embodiment is substantially the same as that of the second embodiment. Note that in the present embodiment, the HEMS controller 30B includes the condition section 332 and the learning section 333, and therefore, the process load of the switch 10B is reduced. Moreover, in the present embodiment, a response time of the device control system (time until a manipulation performed on the switch 10B is reflected to the operation of the device 20) may be shorter than that in the configuration of the second embodiment.

In the present embodiment, the condition section 332 and the learning section 333 are disposed in the HEMS controller 30B, but a function corresponding to the learning section 333 may be provided to a server 40. Providing the function corresponding to the learning section 333 to the server 40 reduces the process loads of the switch 10B and the HEMS controller 30B. The other configurations and operation are similar to those of the second embodiment.

In the above-described embodiment, a touch panel is used as the manipulation section 111, but a push-button switch disposed around the screen of the display section 112 may be used as the manipulation section 111. Moreover, the housing 100 of the switch 10 (10A, 10B) is assumed to be a housing of embedded-type in the above-described embodiment but may be a direct-attachment housing to be attached to the surface of a wall, and an independent housing to be detachably attached to a holder attached on the wall, or the like. The direct-attachment housing includes a plate which is to be fixed on the surface of the wall by a screw or the like and a body to be coupled to the plate. In the housing having such a structure, the body is provided with a manipulation display. Moreover, the direct-attachment housing adopts a structure in which the body is not easily detachable from the plate or a structure in which the body is relatively easily detachable from the plate. In the former structure, the body is coupled to the plate by, for example, a pawl and a hole, or a screw. In the latter structure, the body is coupled to the plate by, for example, magnet. The independent housing is detachably attached to a holder fixed to the surface of the wall by, for example, a screw.

Figure 6:
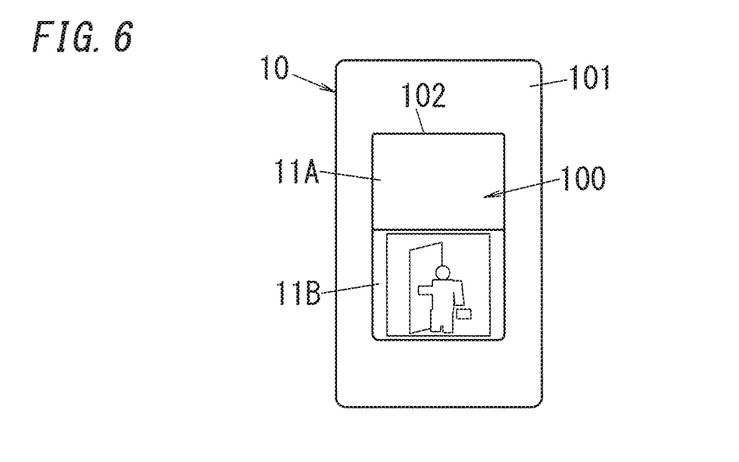
FIG. 6 is an explanatory view illustrating a screen example common to the first to third embodiments.

Moreover, in the above-described configuration example, only one of the display content of the first data tuple and the display content of the second data tuple is displayed in the display section 112. However, the screen of the display section 112 may be partitioned so that both the display content of the first data tuple and the display content of the second data tuple are simultaneously displayed on the one screen. For example, when the screen of the display section 112 has a vertically elongated shape as illustrated in FIG. 6, the screen may be divided into two vertically aligned sections so that a display content corresponding to the first data tuple is displayed in an upper section 11A and a display content corresponding to the second data tuple is displayed in a lower section 11B.

In this configuration, a swipe manipulation performed by a user on the manipulation display 11 enables the display content in the lower section 11B to be changed. For example, it is assumed that the switch 10 (10A, 10B) disposed near the entrance should have estimated the "coming home", but the switch 10 (10A, 10B) erroneously recognized the "going out". In this case, the diagram 103 corresponding to the "going out" as shown in FIG. 3E is displayed although the diagram 103 corresponding to the "coming home" as shown in FIG. 3C should be displayed in the lower section 11B of the display section 112. In such a case, a user performs a swipe manipulation, which makes it possible to display the diagram 103 corresponding to the "coming home" and to perform a manipulation corresponding to the "coming home". Moreover, even when the swipe operation changes the diagram 103 displayed in the lower section 11B of the display section 112, the diagram in the upper section 11A does not change, and therefore, it is possible to turn on or off only the illumination device in the entrance hall by manipulating the switch 10.

According to another configuration example, the processor 13 may also select a plurality of data tuples in the second state on the basis of a plurality of pieces of information such as the date and time, motion sensors, temperatures, climate, and the like additionally or alternatively to selecting one second data tuple in accordance with a prescribed condition. In this case, the display section 112 may be configured such that the screen of the display section 112 is divided so as to simultaneously display a display content of a selected second data tuple and a display content of another selected second data tuple in one screen.

In such a case, a swipe manipulation performed by a user enables the display content of a plurality of second data tuples and the display content of the first data tuple displayed in the display section 112 to be accordingly displayed, and therefore, a simple swipe operation enables selection of a combination of the operations of the devices 20. Moreover, in another configuration example, the display section 112 may be divided into a plurality of sections other than two divided sections, and the first data tuple and the plurality of second data tuples may be simultaneously displayed in combination in the display section 112.

In the above-described configuration example, a dedicated switch 10 (10A, 10B) is configured. However, a smartphone (tablet terminal) may execute a program (a so-called, application) and may function in a similar manner to the above-described switch 10 (10A, 10B). In this case, the smartphone, may be configured such that the program of the smartphone is activated when the smartphone is attached to a holder fixed to the wall.

Moreover, the switch 10 may be provided with a microphone and may be manipulated by voice without contact of a user to the touch panel (manipulation section 111). This enables a user to manipulate the switch 10 even when the switch 10 is in the darkness or both hands of the user are occupied with something.

Note that the above-described embodiment is a mere example of the present invention. Thus, the present invention is not limited to the above-described embodiments, and embodiments other than the above-described embodiments may be modified depending on design and the like without departing from the scope of the technical idea of the present invention.

SUMMARY

As described above, a switch 10 (10A, 10B) according to a first aspect of the present invention includes a manipulation display 11, a processor 13 (13A, 13B), and an outputter 141. The manipulation display 11 includes a manipulation section 111 and a display section 112. The processor 13 is configured to select one of a first state for giving an instruction as to operation of a specific device 20 and a second state for giving an instruction as to operation of a prescribed device 20 which is determined so as to correspond to a specific scene. The outputter 141 is configured to output an instruction signal according to the first state or the second state selected by the processor 13 when the manipulation display 11 is manipulated. The processor 13 is configured to select one of the first state and the second state in response to a specific manipulation performed on the manipulation display 11. Here, the first state is, as described above, a state where a first data tuple is selected. In other words, the first state is a state where the first data tuple corresponding to the specific device 20 is selected, the first data tuple being used for giving an instruction as to the operation of the specific device 20. The second state is, as described above, a state where the second data tuple is selected. In other words, the second state is a state where the second data tuple corresponding to a specific scene is selected, the second data tuple being used for giving an instruction as to the operation(s) of one or a plurality of devices 20 which is determined so as to correspond to the specific scene.

With this configuration, when the first state is selected, the switch 10 can be used to give an instruction as to the operation of the specific device 20, whereas when the second state is selected, the switch 10 can be used to give an instruction as to the operation of the device 20 according to the specific scene such as a live scene. For example, the switch 10 can be used for both a function of turning on and off of an illumination device in a bedroom and a function of collectively turning off the plurality of devices 20 in a dwelling house at the time of going to bed.

In the switch 10 (10A, 10B) according to a second aspect of the present invention referring to the first aspect, the processor 13 preferably causes a display content of the display section 112 in the first state and a display content of the display section 112 in the second state to differ from each other. With this configuration, the display of the display section 112 enables a user to be easily notified of the first state or the second state.

In the switch 10 (10A, 10B) according to a third aspect of the present invention referring to the first or second aspect, the second state is preferably determined so as to give an instruction as to the operation collectively to a plurality of devices 20. That is, in the specific scene, one time of manipulation enables to give an instruction to the plurality of devices 20 collectively.

In the switch 10 (10A, 10B) according to a fourth aspect of the present invention referring to the third aspect, the processor 13 preferably causes the display section 112 to display a diagram 103 or a character representing the specific scene when the second state is selected. With this configuration, a user can intuitively know a scene corresponding to the manipulation performed on the manipulation section 111.

In the switch 10 (10A, 10B) according to a fifth aspect of the present invention referring to any one of first to fourth aspect, the processor 13A includes a learning section 133. The learning section 133 is configured to store operation history of a device 20 disposed in a building and to analyze the operation history to learn operation of the device 20 corresponding to the specific scene. The outputter 141 outputs an instruction signal for giving an instruction as to the operation of the device 20 when the second state is selected, the operation having been learned by the learning section 133.

With this configuration, an instruction content for controlling a device 20 corresponding to a scene is automatically generated.

In the switch 10 (10A, 10B) according to a sixth aspect of the present invention referring to any one of the first to fifth aspects, the processor 13 preferably includes a condition section 132 configured to select the specific scene in the second state based on a date and a time. That is, it is possible to change a device 20 to which an operation should be instructed in a scene according to the date and the time.

A device control method according to a seventh aspect of the present invention is used in a switch including a manipulation display 11 including a manipulation section 111 and a display section 112, and the method includes a process step and an output step. In the process step, one of a first state for giving an instruction as to operation of a specific device 20 and a second state for giving an instruction as to operation of a prescribed device 20 determined so as to correspond to a specific scene. In the output step, an instruction signal according to the first state or the second state selected in the process step is output when the manipulation display 11 is manipulated. In the process step, one of the first state and the second state is selected in response to a specific manipulation performed on the manipulation display 11.

According to the device control method, when the first state is selected, the switch 10 can be used to give an instruction as to the operation of the specific device 20. Moreover, when the second state is selected, the switch 10 can be used to give an instruction as to operation of the device 20 according to the specific scene such as a live scene.

A program according to the present invention is a program configured to cause a computer to function as a processor 13 (13A, 13B) in a switch 10. The switch 10 includes a manipulation display 11 including a manipulation section 111 and a display section 112, the processor 13 (13A, 13B), and an outputter 141. The processor 13 is configured to select one of a first state for giving an instruction as to operation of a specific device 20 and a second state for giving an instruction as to operation of a prescribed device 20 which is determined so as to correspond to a specific scene. The outputter 141 is configured to output an instruction signal according to the first state or the second state selected by the processor 13 when the manipulation display 11 is manipulated. The processor 13 is configured to select one of the first state and the second state in response to a specific manipulation performed on the manipulation display 11.

With this program, when the first state is selected, the switch 10 can be used to give an instruction as to operation of the specific device 20. Moreover, when the second state is selected, the switch 10 can be used to give an instruction as to operation of the device 20 according to the specific scene such as a live scene.

REFERENCE SIGNS LIST

10 Switch
10A Switch
10B Switch
Manipulation Display
Processor
13A Processor
13B Processor
20 Device
30 HEMS Controller (Controller)
30B HEMS Controller (Controller)
111 Manipulation Section
112 Display Section
141 Outputter
132 Condition Section
133 Learning Section
332 Condition Section
333 Learning Section

The invention claimed is:

1. A switch, comprising:
a manipulation display including a manipulation section and a display section;
a processor configured to select one of a first state for giving an instruction as to operation of a specific device and a second state for giving an instruction as to operation of a prescribed device which is determined so as to correspond to a specific scene; and
an outputter configured to output an instruction signal according to the first state or the second state selected by the processor when the manipulation display is manipulated, wherein:
the processor is configured to select one of the first state and the second state in response to a specific manipulation performed on the manipulation display,
the processor selects, as the specific scene, a specific live scene from a plurality of live scenes when the second state is selected, the specific live scene being associated with an established condition among a plurality of predetermined conditions associated with the plurality of live scenes, and
the processor causes the display section to display a diagram representing the specific scene.

2. The switch according to claim 1, wherein
the processor causes a display content of the display section in the first state and a display content of the display section in the second state to differ from each other.

3. The switch according to claim 1, wherein
the second state is determined so as to give an instruction as to operation collectively to a plurality of devices.

4. The switch according to claim 1, wherein
the processor includes a learning section configured to store operation history of a device disposed in a building and to analyze the operation history to learn operation of the device corresponding to the specific scene, and
the outputter outputs an instruction signal for giving an instruction as to the operation of the device when the second state is selected, the operation having been learned by the learning section.

5. The switch according to claim 1, wherein
the processor includes a condition section configured to select the specific scene in the second state based on a day and a time.

6. The switch according to claim 1, wherein the diagram is a pictogram.

7. The switch according to claim 1, wherein the specific scene is a live scene.

8. The switch according to claim 1, wherein
the plurality of live scenes include going to bed, wake-up, coming home, and going out, and
the processor causes the display section to display a diagram representing a live scene selected from a group including the going to bed, wake-up, coming home, and going out live scenes, as the specific scene.

9. A device control method used in a switch including a manipulation display including a manipulation section and a display section, the method comprising:

a process step of selecting one of a first state for giving an instruction as to operation of a specific device and a second state for giving an instruction as to operation of a prescribed device determined so as to correspond to a specific scene; and an output step of outputting an instruction signal according to the first state or the second state selected in the process step when the manipulation display is manipulated, wherein:

in the process step, one of the first state and the second state is selected in response to a specific manipulation performed on the manipulation display, in the process step, a specific live scene is selected, as the specific scene, from a plurality of live scenes when the second state is selected, the specific live scene being associated with an established condition among a plurality of predetermined conditions associated with the plurality of live scenes, and in the process step, the display section displays a diagram reminding of the specific scene.

10. A program configured to cause a computer to function as a processor in a switch, the switch including:

a manipulation display including a manipulation section and a display section;

the processor configured to select one of a first state for giving an instruction as to operation of a specific device and a second state for giving an instruction as to operation of a prescribed device which is determined so as to correspond to a specific scene; and an outputter configured to output an instruction signal according to the first state or the second state selected by the processor when the manipulation display is manipulated, wherein the processor is configured to select one of the first state and the second state in response to a specific manipulation performed on the manipulation display, the processor selects, as the specific scene, a specific live scene from a plurality of live scenes when the second state is selected, the specific live scene being associated with an established condition among a plurality of predetermined conditions associated with the plurality of live scenes, and the processor causes the display section to display a diagram representing the specific scene.

* * * * *